(12) United States Patent
Lee et al.

(10) Patent No.: US 11,175,531 B2
(45) Date of Patent: Nov. 16, 2021

(54) LIGHT GUIDE FILM, BACKLIGHT UNIT AND DISPLAY DEVICE

(71) Applicant: LG Display Co., Ltd., Seoul (KR)

(72) Inventors: SuHun Lee, Paju-si (KR); SangChul Ryu, Paju-si (KR); DongSeok Lee, Paju-si (KR); MyungJoon Park, Paju-si (KR); GwanHoon Park, Paju-si (KR); KyuHwan Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/900,774

(22) Filed: Jun. 12, 2020

(65) Prior Publication Data
US 2020/0400998 A1 Dec. 24, 2020

(30) Foreign Application Priority Data

Jun. 21, 2019 (KR) .......................... 10-2019-0073950
Apr. 28, 2020 (KR) .......................... 10-2020-0051452

(51) Int. Cl.
*G02F 1/13357* (2006.01)
*F21V 8/00* (2006.01)

(52) U.S. Cl.
CPC ..... *G02F 1/133605* (2013.01); *G02B 6/0051* (2013.01); *G02B 6/0055* (2013.01)

(58) Field of Classification Search
CPC ......... G02F 1/133605; G02F 1/133606; G02F 1/133603; G02F 1/133608; G02F 2001/133607; G02B 6/0055; G02B 6/0051; F21V 31/00; F21V 31/005; F21V 31/04; F21V 11/14; F21V 19/005
See application file for complete search history.

(56) References Cited

U.S. PATENT DOCUMENTS

| | | | | |
|---|---|---|---|---|
| 8,937,328 B2* | 1/2015 | Mitsuishi | .............. | H01L 33/504 |
| | | | | 257/98 |
| 2001/0019378 A1* | 9/2001 | Yamaguchi | .......... | G02B 3/0031 |
| | | | | 349/61 |
| 2008/0142829 A1* | 6/2008 | Negley | .................... | H01L 33/58 |
| | | | | 257/98 |
| 2010/0232165 A1* | 9/2010 | Sato | ........................ | G09F 13/14 |
| | | | | 362/296.01 |
| 2010/0244058 A1* | 9/2010 | Weng | ................ | G02F 1/133603 |
| | | | | 257/88 |
| 2010/0321619 A1* | 12/2010 | Tsai | .................. | G02F 1/133555 |
| | | | | 349/114 |

(Continued)

*Primary Examiner* — Jong-Suk (James) Lee
*Assistant Examiner* — James M Endo
(74) *Attorney, Agent, or Firm* — Polsinelli PC

(57) ABSTRACT

Provided are a light guide film, a backlight unit, and a display device. Light guide portions are disposed in holes of a reflection plate on which light sources are disposed, and a light guide film is directly disposed on the reflection plate and the light guide portions to provide a light guiding function and a light shielding function. Therefore, a method of facilitating implementation of a backlight unit with a small thickness, which satisfies image quality is provided. Further, each of the light shielding patterns has different reflectances in different areas, thereby increasing the amount of light supplied to an area between light sources. Therefore, a backlight unit with a reduced number of light sources and improved image quality may be provided.

19 Claims, 15 Drawing Sheets

(56) References Cited

U.S. PATENT DOCUMENTS

| | | | |
|---|---|---|---|
| 2011/0051412 A1* | 3/2011 | Jeong | G02F 1/133603 |
| | | | 362/235 |
| 2011/0149594 A1* | 6/2011 | Terajima | G02B 6/0021 |
| | | | 362/606 |
| 2013/0049025 A1* | 2/2013 | Chang | H01L 25/0753 |
| | | | 257/88 |
| 2013/0334559 A1* | 12/2013 | Vdovin | H01L 33/54 |
| | | | 257/98 |
| 2014/0204578 A1* | 7/2014 | Kim | G02F 1/133605 |
| | | | 362/235 |
| 2015/0009649 A1* | 1/2015 | Jagt | F21K 9/62 |
| | | | 362/84 |
| 2017/0261161 A1* | 9/2017 | Moon | G02B 6/0055 |
| 2017/0285408 A1* | 10/2017 | Peng | G02F 1/133611 |
| 2018/0023784 A1* | 1/2018 | Tamura | G02F 1/133611 |
| | | | 362/235 |
| 2018/0080625 A1* | 3/2018 | Yamada | F21V 9/30 |
| 2018/0182940 A1* | 6/2018 | Yamamoto | G02F 1/133605 |
| 2019/0265549 A1* | 8/2019 | Chen | G02F 1/133606 |

* cited by examiner

FIG.5
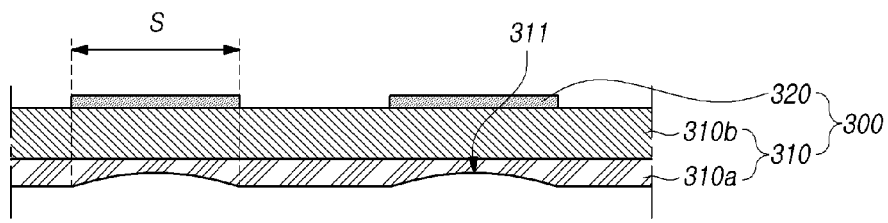
<Case A>
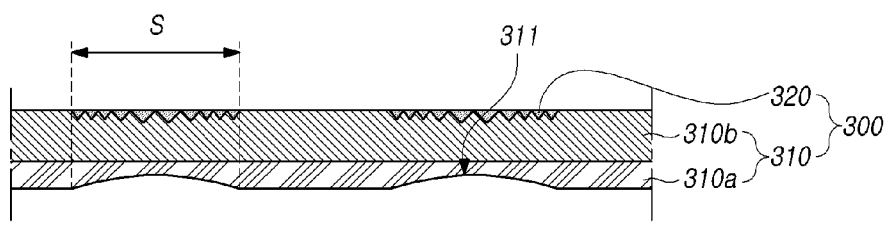
<Case B>

FIG.6
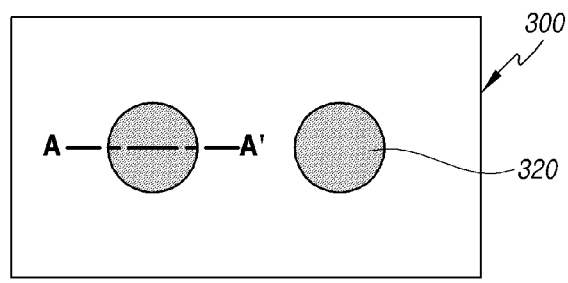
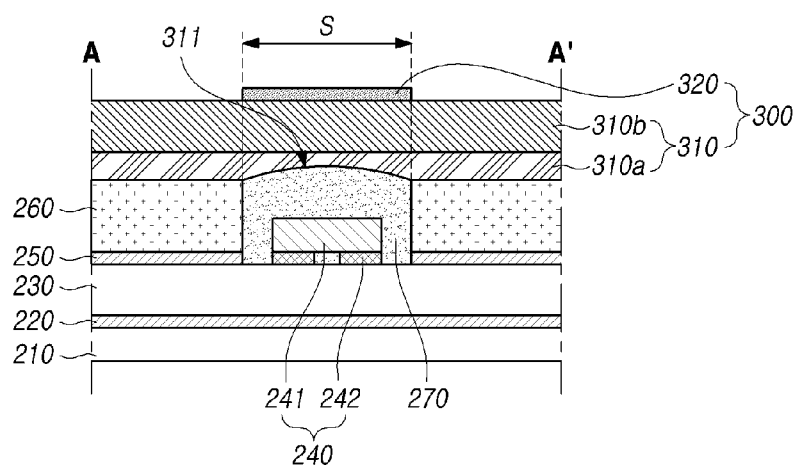

FIG. 7
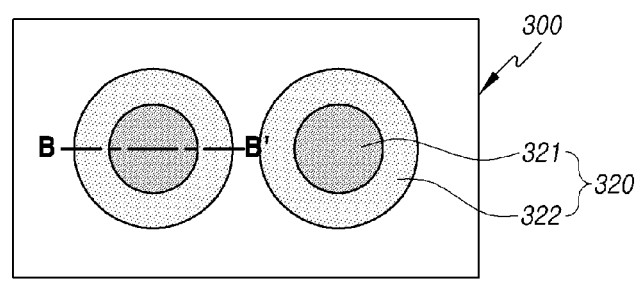
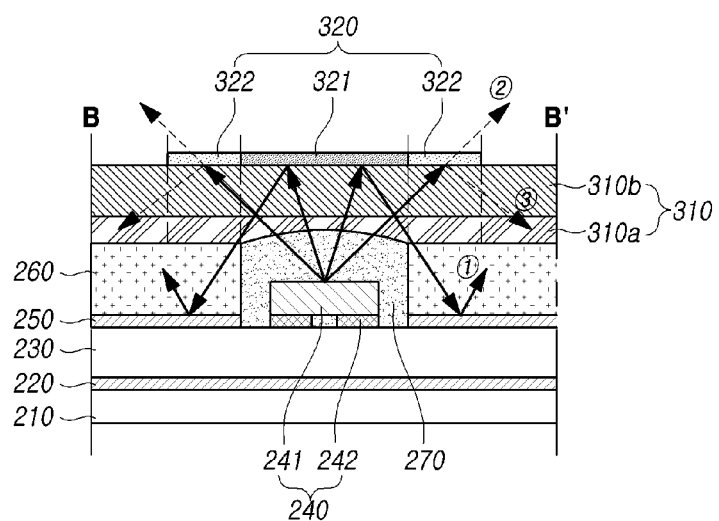

FIG.8A
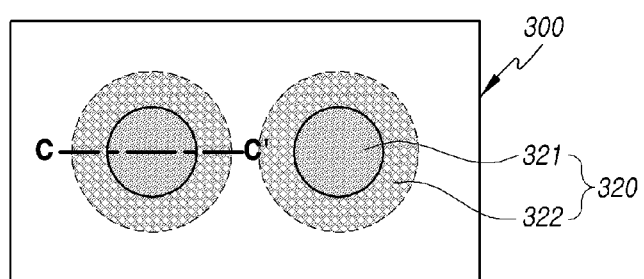
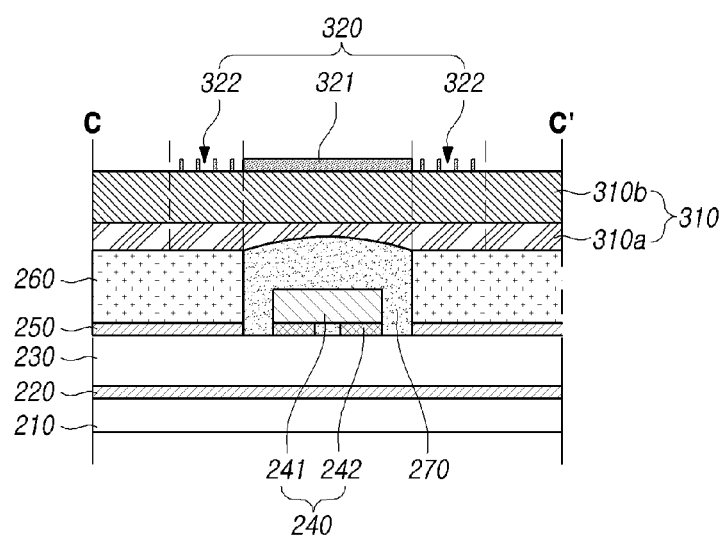

FIG.8B
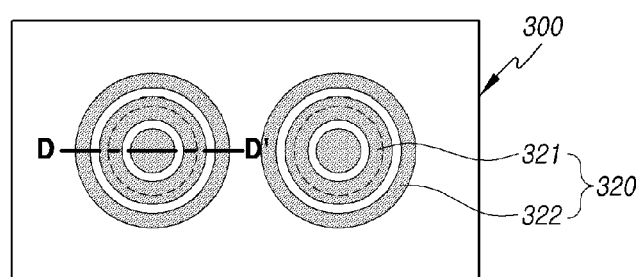
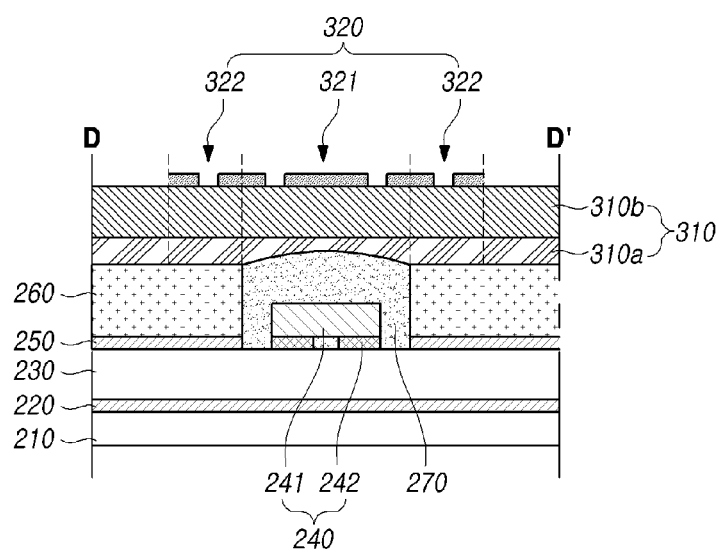

FIG.13

| | Case 1 | Case 2 | Case 3 | Case 4 |
|---|---|---|---|---|
| structure | 700 / 600 / 500 / 310b+320 / 310a / 260 / 240 | 700 / 600 / 500 / 310+320 / 260 / 240 | 700 / 600 / 500 / 310b+320+340 / 310a / 260 / 240 | 700 / 600 / 500 / 310+320+340 / 260 / 240 |
| luminance | 100% | 107% | 110% | 108% |
| BLU FOS | level 1-2 | level 1-2 | level 1-2 | level 1-2 |
| power consumption | 100% | 92% | 90% | 91% |

LIGHT GUIDE FILM, BACKLIGHT UNIT AND DISPLAY DEVICE

CROSS-REFERENCE TO RELATED APPLICATIONS

This application claims priority from Korean Patent Application No. 10-2019-0073950 filed on Jun. 21, 2019 and Korean Patent Application No. 10-2020-0051452 filed on Apr. 28, 2020, which are hereby incorporated by reference in their entirety.

BACKGROUND

Field of the Disclosure

The present disclosure relates to a light guide film, a backlight unit, and a display device.

Description of the Background

Along with the development of the information society, demands for display devices that display images are growing. In this regard, various types of display devices, such as liquid crystal display (LCD) devices and organic light emitting diode (OLED) display devices, have been widely used.

Among these display devices, an LCD device may include a display panel and an optical device supplying light to the display panel, such as a backlight unit.

Therefore, the display device may be thick due to the backlight unit. If the thickness of the backlight unit is reduced, a sufficient optical gap is not secured between light sources and the display panel, thereby degrading image quality.

SUMMARY

The present disclosure provides a backlight unit with a reduced thickness, which satisfies image quality, and a display device including the backlight unit.

The present disclosure provides a method of facilitating implementation of a backlight unit with a small thickness, which satisfies image quality.

According to an aspect, the present disclosure provides a display device including a display panel and a backlight unit supplying light to the display panel.

The backlight unit includes a plurality of light sources disposed on a printed circuit, a reflection plate disposed on the printed circuit and including a plurality of holes in which the plurality of light sources are disposed respectively, a plurality of light guide portions disposed respectively in the plurality of holes to surround the plurality of light sources, and a light guide film disposed on the reflection plate and the plurality of light guide portions, and including at least one light guide layer and a plurality of light shielding patterns positioned on a top surface of the light guide layer, in correspondence with the plurality of light sources respectively.

Further, the light guide film further includes a coating layer disposed on the top surface of the light guide layer on which the light shielding patterns are disposed, protecting the light shielding patterns, and having a flat top surface.

Herein, a top surface of each of the plurality of light guide portions may be convex, and at least a part of the top surface of the light guide portion may be positioned higher than a top surface of the reflection plate.

Alternatively, the top surfaces of the plurality of light guide portions may be positioned on the same plane with the top surface of the reflection plate.

According to another aspect, the present disclosure provides a light guide film including a first light guide layer having one surface on which a plurality of concave portions are included and the other surface being flat, opposite to the one surface, a second light guide layer contacting the other surface of the first light guide layer, and having both flat surfaces, and a plurality of light shielding patterns disposed on a surface of the second light guide layer other than the surface of the second light guide layer, contacting the first light guide layer.

Herein, the plurality of light shielding patterns may be disposed respectively at positions corresponding to the plurality of concave portions.

Alternatively, each of the plurality of light shielding patterns may include a first portion having a first reflectance and a second portion disposed outside the first portion and having a second reflectance smaller than the first reflectance. Herein, the first portion may be disposed at a position corresponding to a concave portion, and at least a part of the second portion is disposed at a position corresponding to a position around the concave portion.

According to aspects of the present disclosure, light sources and light guide portions are disposed in holes formed in a reflection plate, and a light guide film including light shielding patterns is disposed on the reflection plate and the light guide portions. Therefore, the thickness of a backlight unit is reduced, and image quality may be maintained.

According to aspects of the present disclosure, a light guide film with a light guiding function and a light shielding function is disposed attached onto light guide portions and a reflection plate. Therefore, a backlight unit with a reduced thickness may easily be implemented.

DESCRIPTION OF DRAWINGS

The above and other objects, features, and advantages of the present disclosure will be more clearly understood from the following detailed description, taken in conjunction with the accompanying drawings, in which:

FIG. 5 is a diagram illustrating an exemplary structure of a light guide film included in the backlight unit illustrated in FIG. 3;

FIG. 6 is a diagram illustrating an exemplary structure of a light shielding pattern disposed on the light guide film illustrated in FIG. 5;

FIG. 7 is a diagram illustrating another exemplary structure of the light shielding pattern disposed on the light guide film illustrated in FIG. 5;

FIGS. 8A, 8B and 8C are diagrams illustrating specific implementation examples of the structure of the light shielding pattern illustrated in FIG. 7;

FIG. 13 is a table listing the test results of performance for each backlight unit structure according to aspects of the present disclosure.

DETAILED DESCRIPTION

Figure 1:
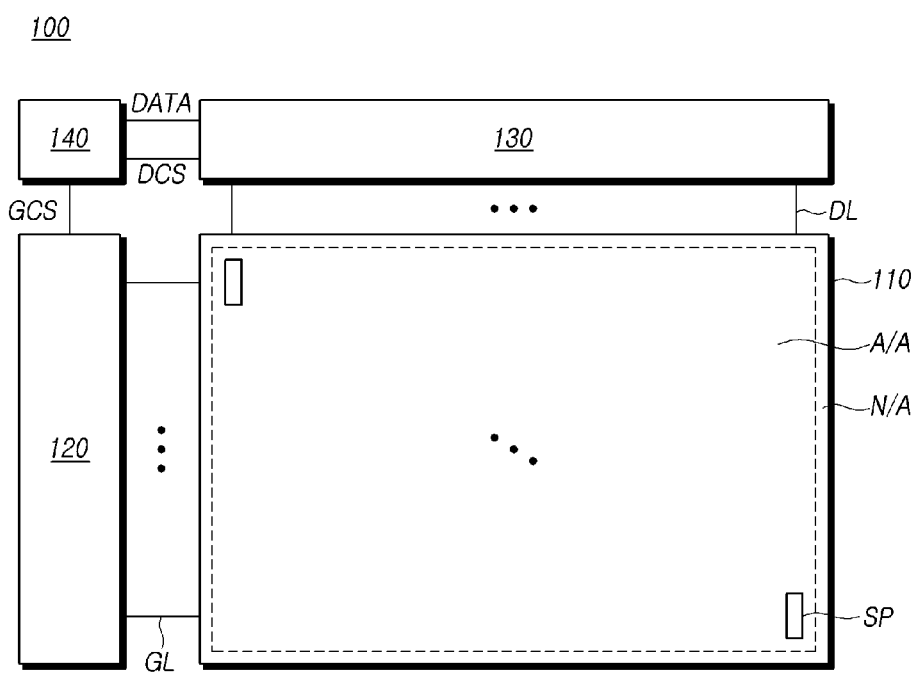
FIG. 1 is a schematic diagram illustrating the configuration of a display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a schematic diagram illustrating the configuration of a display device 100 according to aspects of the present disclosure.

Referring to FIG. 1, the display device 100 according to aspects of the present disclosure may include a display panel 110 including an active area A/A and a non-active area N/A, and a gate driver circuit 120, a data driver circuit 130, and a controller 140 for driving the display panel 110.

In the display panel 110, a plurality of gate lines GL and a plurality of data lines DL may be disposed, and a plurality of subpixels SP may be disposed at intersections between the gate lines GL and the data lines DL.

The gate driver circuit 120 may be controlled by the controller 140 and control driving timings of the plurality of subpixels SP by sequentially outputting a scan signal to the plurality of gate lines GL disposed in the display panel 110.

The gate driver circuit 120 may include one or more gate driver integrated circuits (GDICs), and may be located on one side or both sides of the display panel 110 depending on a driving scheme.

Each GDIC may be coupled to a bonding pad of the display panel 110 by tape automated bonding (TAB) or chip on glass (COG), or may be configured as a gate in panel (GIP) type and disposed directly in the display panel 110. When needed, each GDIC may be integrated in the display panel 110. Further, each GDIC may be mounted on a film coupled to the display panel 110 by chip on film (COF).

The data driver circuit 130 may receive image data DATA from the controller 140 and convert the image data to an analog data voltage. In addition, the data driver circuit 130 may output the data voltage to the respective data lines DL at timings when the scan signal is applied through the gate lines GL, so that the subpixels SP exhibit luminous intensities corresponding to the image data.

The data driver circuit 130 may include one or more source driver integrated circuits (SDICs).

Each SDIC may include a shift register, a latch circuit, a digital-to-analog converter, an output buffer, and so on.

Each SDIC may be coupled to the bonding pad of the display panel 110 by TAB or COG, or may be disposed directly in the display panel 110. When needed, each SDIC may be integrated in the display panel 110. Further, each SDIC may be implemented by COF. In this case, the SDIC may be mounted on a film coupled to the display panel 110 and electrically coupled to the display panel 110 through a wire on the film.

The controller 140 may apply various control signals to the gate driver circuit 120 and the data driver circuit 130 to control operations of the gate driver circuit 120 and the data driver circuit 130.

The controller 140 may be mounted on a printed circuit board (PCB), a flexible printed circuit, or the like and electrically coupled to the gate driver circuit 120 and the data driver circuit 130 through the PCB, the flexible printed circuit, or the like.

The controller 140 may control the gate driver circuit 120 to output the scan signal at a timing defined by each frame. The controller 140 may convert image data received from an external source into a data signal format used in the data driver circuit 130 and output the converted image data to the data driver circuit 130.

The controller 140 may receive various timing signals, in addition to the image data, from an external source (e.g., a host system). The timing signals may include a vertical synchronization signal VSYNC, a horizontal synchronization signal HSYNC, an input data enable signal DE, a clock signal CLK, and so on.

The controller 140 may generate various control signals using the various timing signals received from the external source and output the control signals to the gate driver circuit 120 and the data driver circuit 130.

For example, the controller 140 may output various gate control signals GCS to control the gate driver circuit 120, including a gate start pulse GSP, a gate shift clock signal GSC, a gate output enable signal GOE, and so on.

The gate start pulse GSP may control operation start timings of the one or more GDICs of the gate driver circuit 120. The gate shift clock signal GSC may be a clock signal input commonly to the one or more GDICs to control shift timings of the scan signal. The gate output enable signal GOE may specify timing information for the one or more GDICs.

Further, the controller 140 may output various data control signals DCS to control the data driver circuit 130, including a source start pulse SSP, a source sampling clock signal SSC, a source output enable signal SOE, and so on.

The source start pulse SSP may control data sampling start timings of the one or more SDICs of the data driver circuit 130. The source sampling clock signal SSC may be a clock signal controlling a data sampling timing for each of the SDICs. The source output enable signal SOE may control an output timing of the data driver circuit 130.

The display device 100 may further include a power management integrated circuit (PMIC) which applies various types of voltage or current to the display panel 110, the gate driver circuit 120, the data driver circuit 130, and so on, or controls various types of voltage or current to be applied thereto.

Each subpixel SP may be an area defined by intersection between a gate line GL and a data line DL, in which a liquid crystal or a light emitting element may be disposed according to the type of the display device 100.

For example, when the display device 100 is an LCD device, the display device 100 may include an optical device such as a backlight unit irradiating light onto the display panel 110, and liquid crystals may be disposed in the subpixels SP of the display panel 110. The orientation of the liquid crystals may be adjusted by an electric field generated by applying the data voltage to each subpixel SP, so that an image may be displayed by representing luminous intensities corresponding to image data.

Accordingly, the backlight unit may increase the thickness of the display device 100.

Aspects of the present disclosure provide a backlight unit with a reduced thickness, which may maintain image quality, and a method of facilitating implementation of the backlight unit with the reduced thickness.

Figure 2:
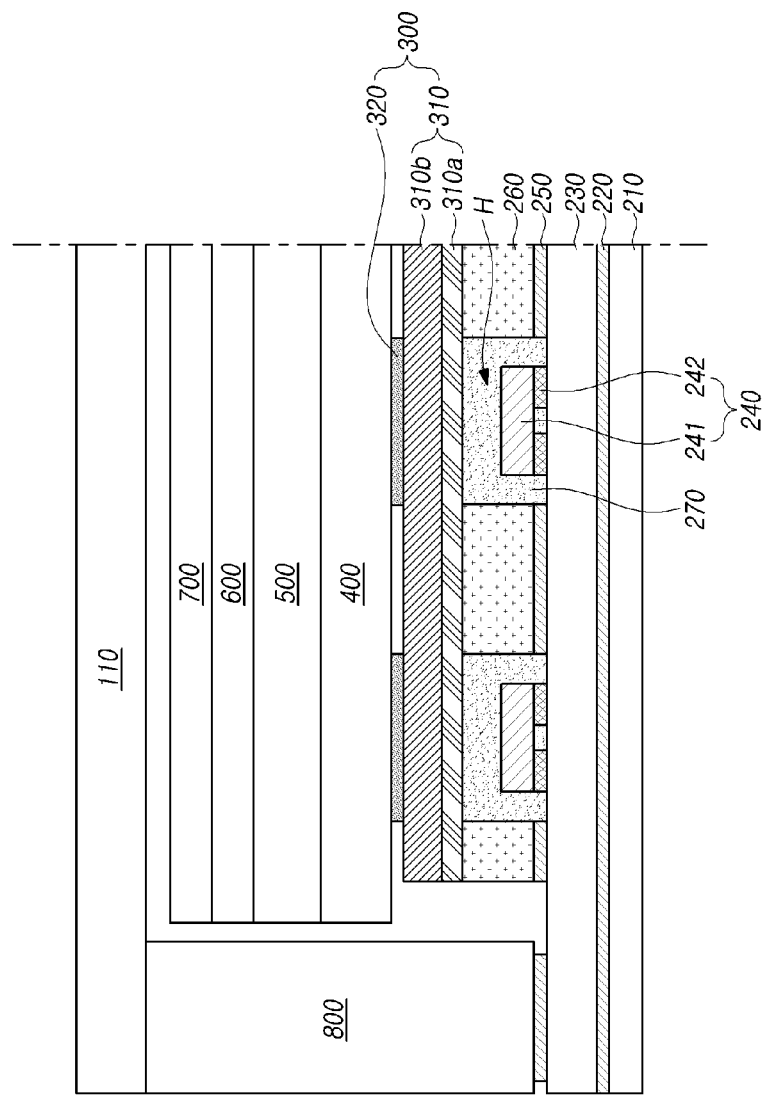
FIG. 2 is a diagram illustrating an exemplary cross-section structure of a backlight unit according to aspects of the present disclosure.

FIG. 2 is a diagram illustrating an exemplary cross-section structure of the backlight unit according to aspects of the present disclosure.

Referring to FIG. 2, the backlight unit may be disposed under the display panel 110 and include multiple optical members to supply light to the display panel 110.

For example, the backlight unit may include a plurality of light sources 240 disposed on a printed circuit 230. The printed circuit 230 may be disposed attached onto a plate 210 by a first adhesive layer 220. The plate 210 may be a cover bottom according to the type of the display device 100.

Each of the light sources 240 may include a light emitting portion 241 emitting light and an electrode portion 242 to which a signal for driving the light emitting portion 241 is applied. The light source 240 may emit light in a white wavelength band, and light in a specific wavelength band in some cases. For example, the light source 240 may emit light in a blue wavelength band and excite the light through an optical member disposed on the light source 240 (e.g., convert a portion of the emitted blue light into light of another specific wavelength band (e.g., a yellow wavelength band) through the optical member, and combine the light obtained through the conversion with the emitted blue light to obtain white light), to supply the light in the white wavelength band to the display panel 110.

A reflection plate 260 may be disposed on the printed circuit 230. The reflection plate 260 may be disposed attached onto the printed circuit 230 by a second adhesive layer 250. The reflection plate 260 may include a plurality of holes H, and the light sources 240 may be disposed in the holes H included in the reflection plate 260. That is, the reflection plate 260 with a reflection function may be disposed in at least a part of areas in which the light sources 240 are not disposed on the printed circuit 230.

The top surface of the reflection plate 260 may be positioned higher than the top ends of the light sources 240 disposed in the holes H. Light guide portions 270 may be disposed in the holes H of the reflection plate 260. That is, a plurality of light guide portions 270 may be disposed in the respective holes H.

The light guide portions 270 may be formed of, for example, resin. Further, the light guide portions 270 may be disposed to surround the light sources 240 in the holes H of the reflection plate 260. That is, the light guide portions 270 may be disposed to fill in spaces except for spaces occupied by the light sources 240 in the holes H of the reflection plate 260.

As such, the light guide portions 270 may be disposed in direct contact with the light sources 240 and guide light emitted from the light sources 240 to be diffused upward.

The top surfaces of the light guide portions 270 may be flat and located on the same plane with the top surface of the reflection plate 260.

A light guide film 300 may be disposed on the light guide portions 270 and the reflection plate 260.

The light guide film 300 may include at least one light guide layer 310 and optical patterns disposed on the light guide layer 310.

For example, the light guide film 300 may include a first light guide layer 310a disposed on the reflection plate 260 and the light guide portions 270 and having a flat top surface, a second light guide layer 310b disposed on the first light guide layer 310a, and a plurality of light shielding patterns 320 disposed on the second light guide layer 310b.

The first light guide layer 310a may be, for example, a silicone-based adhesive layer, and may be disposed in direct contact with the top surface of the reflection plate 260 and the top surfaces of the light guide portions 270. Therefore, the light guide film 300 may easily be disposed on the reflection plate 260 and the light guide portions 270, and provide a function of guiding light emitted through the light guide portions 270.

The second light guide layer 310b may be formed of, for example, polycarbonate (PC) or polyethylene terephthalate (PET), and provide the light guiding function together with the first light guide layer 310a. That is, the first light guide layer 310a and the second light guide layer 310b may be disposed on the light guide portions 270 to uniformly diffuse light emitted from the light sources 240 to the display panel 110.

The first light guide layer 310a and the second light guide layer 310b are merely an example, and the light guide film 300 may include only one light guide layer 310 or a plurality of light guide layers 310. Further, the first light guide layer 310a disposed under the second light guide layer 310b may be considered to be an adhesive layer disposed separately from the light guide film 300 in some cases. Further, the first light guide layer 310a may be thicker than the second light guide layer 310b or vice versa, when needed.

The light shielding patterns 320 may be disposed on the top surface of the second light guide layer 310b. The light shielding patterns 320 may be disposed in correspondence with the light sources 240 disposed on the printed circuit 230. This may amount to disposing the light shielding patterns 320 in correspondence with the holes H of the reflection plate 260.

The light shielding patterns 320 may provide reflection, scattering, and diffraction functions. As the light shielding patterns 320 are disposed in correspondence with the light sources 240, the light shielding patterns 320 may provide a function of shielding at least part of light emitted vertically from the light sources 240. In other words, the light shielding patterns 320 may reflect at least part of light emitted vertically from the light sources 240 toward the reflection plate 260. Further, the light shielding patterns 320 may transmit part of arriving light or change the path of the light. Therefore, even though the distances between the light sources 240 and the display panel 110 are reduced, generation of hot spots at positions corresponding to the light sources 240 may be prevented.

A plurality of optical sheets may be disposed on the light guide film 300. For example, a diffusion plate 400, a color conversion sheet 500, a prism sheet 600, and a diffusion sheet 700 may be disposed on the light guide film 300.

A structure for maintaining the shape of the backlight unit may be disposed outside areas in which the light sources 240 are disposed on the printed circuit 230. For example, a dam 800 may be disposed along the outer periphery of the printed circuit 230. Alternatively, a guide panel or the like may be disposed in some cases.

As such, the light guide film 300 providing the light guiding function and the light shielding function may be disposed, thereby preventing an increase in the thickness of the backlight unit and maintaining image quality. Further, a backlight unit of a small thickness may easily be implemented by directly attaching the light guide film 300 on the reflection plate 260 and the light guide portions 270.

Further, the top surfaces of the light guide portions 270 may be shaped to be convex, to thereby enhance the light extraction function of the light guide portions 270 and facilitate arrangement of the light guide film 300.

Figure 3:
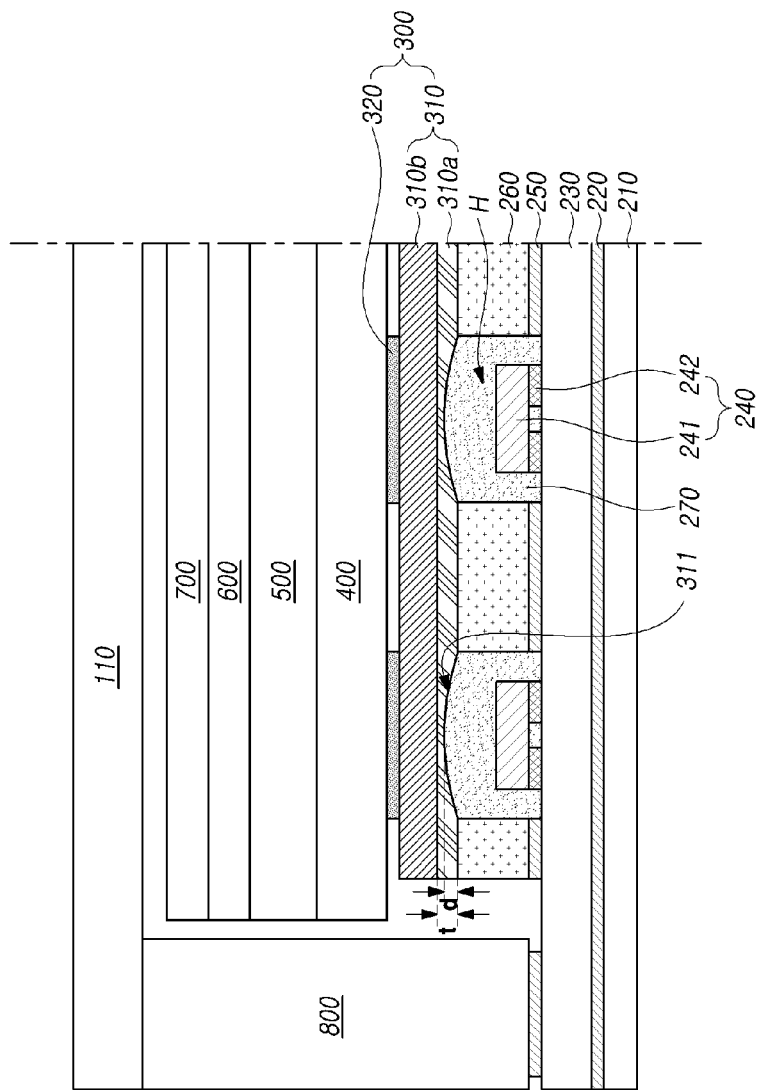
FIG. 3 is a diagram illustrating another exemplary cross-section structure of the backlight unit according to aspects of the present disclosure.

FIG. 3 is a diagram illustrating another exemplary cross-section structure of the backlight unit according to aspects of the present disclosure.

Referring to FIG. 3, the backlight unit may include a plurality of light sources 240 disposed on the printed circuit 230, and the reflection plate 260 disposed on the printed circuit 230 and including a plurality of holes H. The light sources 240 may be disposed in the holes H of the reflection plate 260.

Light guide portions 270 may be disposed in the holes H of the reflection plate 260, and the light guide film 300 may be disposed on the light guide portions 270 and the reflection plate 260.

The top surfaces of the light guide portions 270 may be shaped to be convex. At least a part of the top surface of each of the light guide portions 270 may be positioned higher than the top surface of the reflection plate 260.

That is, the top surfaces of the light guide portions 270 may be positioned a little higher than the top surface of the reflection plate 260 in the process of disposing the light guide portions 270 in the holes H of the reflection plate 260. Therefore, the light guide portions 270 may be disposed such that parts of the light guide portions 270 cover parts of the top surface of the reflection plate 260.

The function of extracting light emitted from the light sources 240 may be improved by shaping the top surfaces of the light guide portions 270 surrounding the light sources 240 in the holes H of the reflection plate 260 to be convex.

As the top surfaces of the light guide portions 270 are convex, the bottom surface of the light guide film 300 disposed on the light guide portions 270 may be shaped to be concave.

For example, the light guide film 300 disposed on the reflection plate 260 and the light guide portions 270 may include the first light guide layer 310a, the second light guide layer 310b, and light shielding patterns 320.

The first light guide layer 310a may be disposed in direct contact with the reflection plate 260 and the light guide portions 270, and may include concave portions 311 in parts corresponding to the light guide portions 270 having the convex top surfaces. The top surface of the first light guide layer 310a may be flat, which is opposite to a surface of the first light guide layer 310a on which the concave portions 311 are disposed.

Accordingly, the first light guide layer 310a may provide the light guiding function and an adhesion function, and prevent formation of steps which might otherwise be caused by the convex shapes of the light guide portions 270, as well. Therefore, the light guide film 300 may be disposed more easily.

Because the first light guide layer 310a should be disposed on the entirety of the reflection plate 260 and the light guide portions 270, the thickness t of the thickest part of the first light guide layer 310a may be larger than the vertical distance d between the highest point of each of the light guide portions 270 and the highest point of the reflection plate 260.

That is, because the first light guide layer 310a should be disposed on the top surfaces of the light guide portions 270, for the adhesion function and have a flat top surface, for a planarization function, the first light guide layer 310a may have a thickness equal to or larger than the difference between the height of the light guide portions 270 and the height of the reflection plate 260.

The second light guide layer 310b may be disposed on the first light guide layer 310a, and the light shielding patterns 320 may be disposed on the second light guide layer 310b at positions corresponding to the light sources 240.

As such, the top surfaces of the light guide portions 270 may be shaped to be convex to prevent generation of empty spaces between the light guide portions 270 and the light guide film 300 disposed on the light guide portions 270. Accordingly, the light guide film 300 providing the light guiding function and the light shielding function may be disposed easily, and the light extraction function provided by the light guide portions 270 and the light guide layers of the light guide film 300 may be improved.

Figure 4:
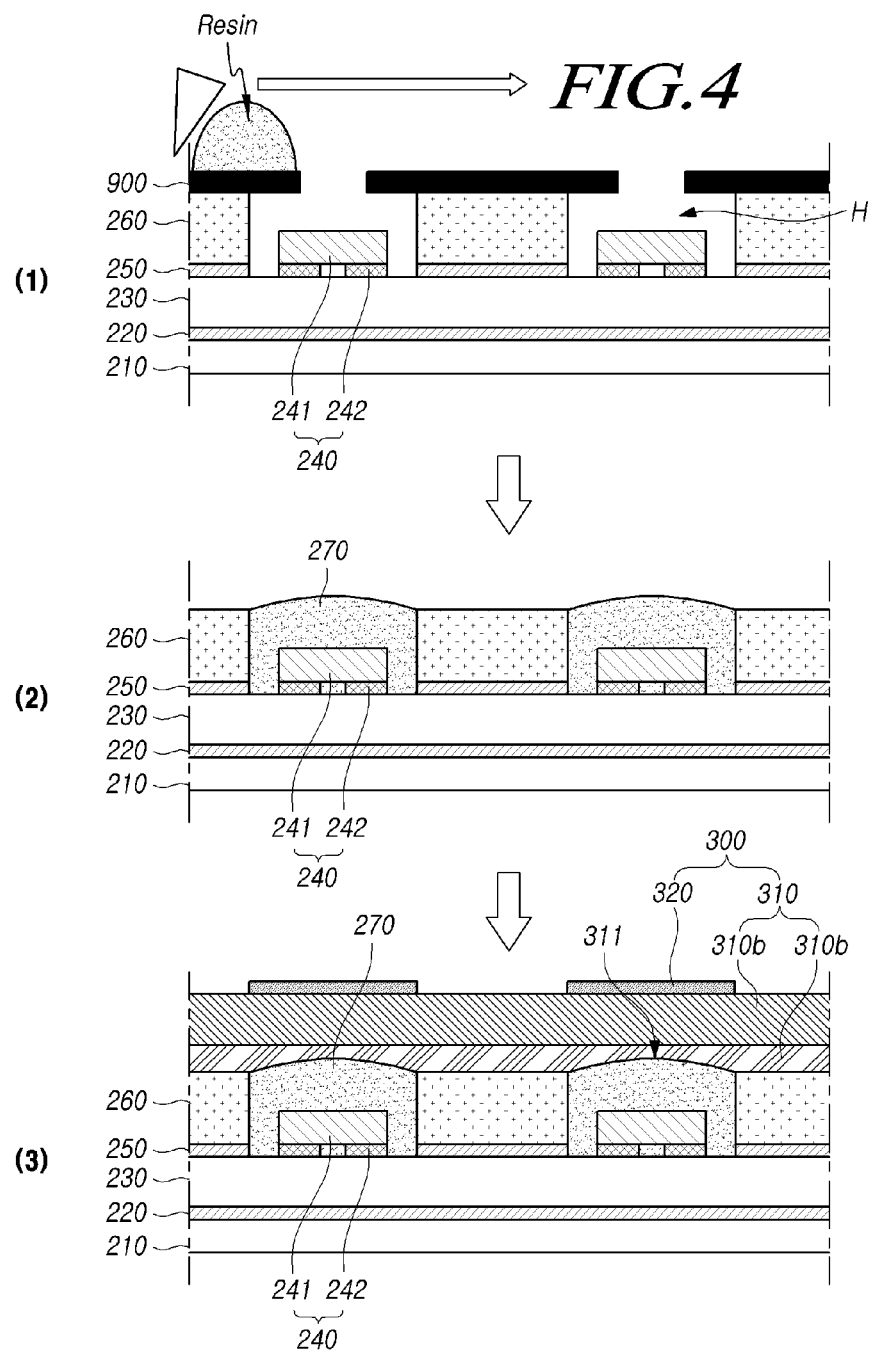
FIG. 4 is a diagram illustrating an exemplary process of fabricating the backlight unit illustrated in FIG. 3.

FIG. 4 is a diagram illustrating an exemplary process of fabricating the backlight unit illustrated in FIG. 3

Referring to FIG. 4, the light sources 240 and the reflection plate 260 including the holes H may be disposed on the printed circuit 230 as illustrated in FIG. 4(1). A metal mask 900 opened at parts corresponding to the holes H of the reflection plate 260 may be disposed on the reflection plate 260. Subsequently, a material (e.g., resin) of which the light guide potions 270 are formed may be disposed in the holes H of the reflection plate 260.

When the material of which the light guide portions 270 are formed is completely disposed in the holes H of the reflection plate 260, the light guide portions 270 may be formed by curing the material disposed in the holes H of the reflection plate 260 as illustrated in FIG. 4(2). Herein, the top surfaces of the light guide portions 270 may be shaped to be convex.

When the light guide portions 270 are formed, the light guide film 300 including the first light guide layer 310a, the second light guide layer 310b, and the light shielding patterns 320 may be disposed on the light guide portions 270 and the reflection plate 260, as illustrated in FIG. 4(3). Therefore, the bottom surface of the first light guide layer 310a disposed in a lower part of the light guide film 300 may include the concave portions 311 corresponding to the convex shapes of the light guide portions 270.

As such, the light guide portions 270 may be shaped to be convex, thereby preventing generation of an air gap between the light guide film 300 and the light guide portions 270 in the process of disposing the light guide film 300 on the light guide portions 270 and the reflection plate 260.

Further, the backlight unit with a reduced thickness, which may maintain image quality may be provided by providing both the light guiding function and the light shielding function by the light guide film 300 including the concave portions 311 formed on a light incident surface and the light shielding patterns 320 disposed on a light emitting surface.

FIG. 5 is a diagram illustrating an exemplary structure of the light guide film 300 included in the backlight unit illustrated in FIG. 3.

Referring to FIG. 5, the light guide film 300 may include the first light guide layer 310a including at least one concave portion 311, the second light guide layer 310b disposed on the first light guide layer 310a, and at least one light shielding pattern 320 disposed on the second light guide layer 310b.

The first light guide layer 310a may include the concave portions 311 on the bottom surface thereof, and may be flat on the top surface thereof. The first light guide layer 310a may provide the planarization function of compensating for steps as well as the light guiding function and the adhesion function.

The second light guide layer 310b may be disposed on the first light guide layer 310a, thus providing the light guiding function. The second light guide layer 310b may be flat on the top surface thereof, on which the light shielding patterns 320 may be disposed.

The light shielding patterns 320 may be disposed at positions corresponding to the concave portions 311 disposed on the bottom surface of the first light guide layer 310a.

For example, the area S of each of the light shielding patterns 320 may be equal to the area of the entrance of each of the concave portions 311. Alternatively, the area S of each of the light shielding patterns 320 may be larger than the area of the entrance of each of the concave portions 311, when needed.

That is, the concave portions 311 may be formed along the shapes of the holes H in which the light sources 240 are disposed, and the light shielding patterns 320 may be disposed to cover the holes H. Therefore, the area S of each of the light shielding patterns 320 may be equal to or larger than the area of the entrance of each of the concave portions 311.

Alternatively, in another example, the area S of each of the light shielding patterns 320 may be smaller than the area of the entrance of each of the concave portions 311. In the above example, when the light guide portions 270 are disposed to cover parts of the top surface of the reflection plate 260, the areas of the entrances of the concave portions 311 may also be increased. When each of the light shielding patterns 320 is disposed over the same area as that of each hole H, the area S of each of the light shielding patterns 320 may be smaller than the area of the entrance of each of the concave portions 311.

These light shielding patterns 320 may be disposed by printing a light shielding material such as ink on the second light guide layer 310b (Case A) or by etching the top surface of the second light guide layer 310b (Case B).

Further, the light shielding patterns 320 may be positioned in correspondence with the holes H of the reflection plate 260, in which the light sources 240 are disposed, or may be positioned partially in correspondence with positions around the holes H.

FIG. 6 is a diagram illustrating an exemplary structure of a light shielding pattern 320 disposed on the light guide film 300 illustrated in FIG. 5.

Referring to FIG. 6, a light guide portion 270 having a convex top surface is disposed in a hole H of the reflection plate 260, in which a light source 240 is disposed. The light guide film 300 may be disposed on the reflection plate 260 and the light guide portion 270.

The light guide film 300 may include the first light guide layer 310a including a concave portion 311 on the bottom surface thereof, the second light guide layer 310b disposed on the first light guide layer 310a, and the light shielding pattern 320 disposed on the second light guide layer 310b.

The light shielding pattern 320 may be disposed in correspondence with the light source 240. The light shielding pattern 320 may be disposed overlapping with the hole H in which the light source 240 is disposed. That is, the light shielding pattern 320 may be disposed in a one-to-one correspondence with the light source 240, and the area S of the light shielding pattern 320 may be equal to the area of the hole H in which the light source 240 is disposed.

Therefore, the light guide portion 270, the first light guide layer 310a, and the second light guide layer 310b which are disposed on the light source 240 may provide the light guiding function, and the light shielding pattern 320 may be disposed in an area with a largest luminous intensity, thereby preventing degradation of image quality.

Further, the light shielding pattern 320 may include a plurality of parts having different reflectances, when needed.

FIG. 7 is a diagram illustrating another exemplary structure of a light shielding pattern 320 disposed on the light guide film 300 illustrated in FIG. 5.

Referring to FIG. 7, a light source 240 is disposed in a hole H of the reflection plate 260, and a light guide portion 270 may be disposed in the hole H, surrounding the light source 240. The light guide portion 270 may be convex on the top surface thereof, and the light guide film 300 may be disposed on the light guide portion 270.

The light guide film 300 may be disposed in direct contact with the light guide portion 270 and the reflection plate 260, and include the first light guide layer 310a, the second light guide layer 310b, and the light shielding pattern 320.

The light shielding pattern 320 may include a first portion 321 having a first reflectance and a second portion 322 having a second reflectance smaller than the first reflectance, defined around the first portion 321. That is, the first portion 321 may provide a strong light shielding function, and the second portion 322 may provide a light shielding function weaker than the first portion 321.

The first portion 321 may be positioned in correspondence with the hole H of the reflection plate 260, and the second portion 322 may be positioned in correspondence with a position around the hole H of the reflection plate 260.

Because the first portion 321 having a high reflectance corresponds to the hole H of the reflection plate 260 in which the light source 240 is disposed, light may be shielded in an area with a strong luminous intensity. Further, the light shielding pattern 320, particularly the second portion 322 having a lower reflectance than the first portion 321 is disposed around the hole H to efficiently provide the light shielding function, thereby increasing the luminous uniformity of the backlight unit.

That is, when light emitted from the light source 240 reaches the first portion 321 of the light shielding pattern 320, the light may be mostly reflected toward the reflection plate 260 and supplied to an area between light sources 240 by the light guide layers 310 of the light guide film 300 and the reflection plate 260, as indicated by reference numeral ①. Further, when the light emitted from the light source 240 reaches the second portion 322 of the light shielding pattern 320, a part of the light may be transmitted through the second portion 322, as indicated by reference numeral ②, while another part of the light may be reflected, as indicated by reference numeral ③. The light reflected from the second portion 322 of the light shielding pattern 320 may be supplied to the area between the light sources 240 by the light guide layers 310 of the light guide film 300 and the reflection plate 260.

Therefore, light may be supplied uniformly to the area corresponding to the hole H of the light source 240, the area around the hole H, and the area between the light sources 240, thereby improving the overall image quality of the backlight unit.

The reflectances of the first portion 321 and the second portion 322 of the light shielding pattern 320 may be controlled, for example, by differentiating the ratio of a light shielding material disposed in each portion to the portion.

Figure 8C:
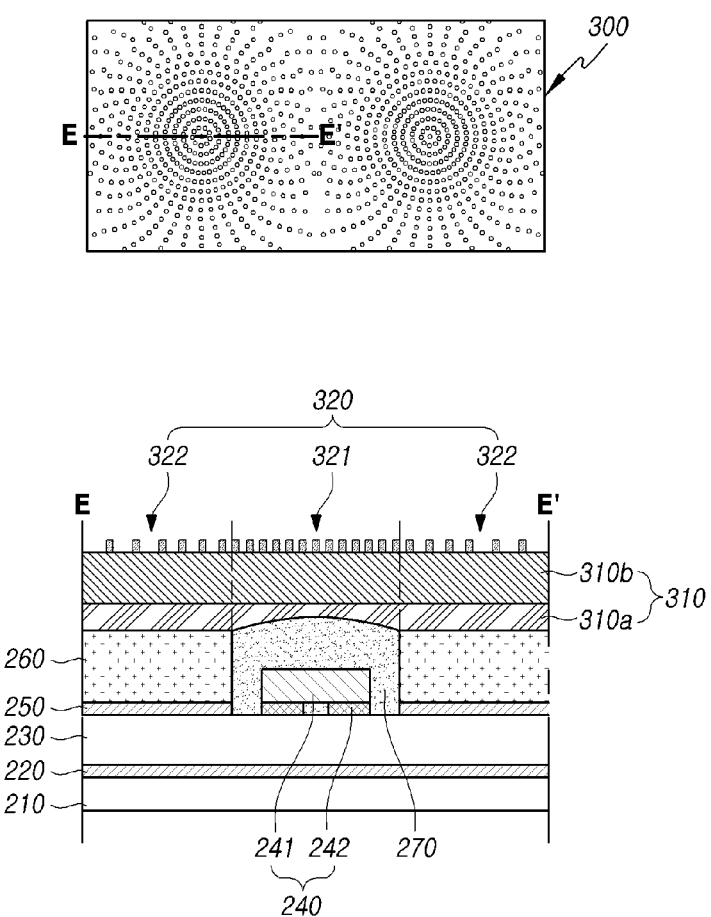

FIGS. 8A, 8B and 8C are diagrams illustrating specific implementation examples of the structure of the light shielding pattern 320 illustrated in FIG. 7.

Referring to FIGS. 8A, 8B and 8C, the light shielding pattern 320 disposed on the second light guide layer 310b of the light guide film 300 may include the first portion 321 having the first reflectance and the second portion 322 having the second reflectance smaller than the first reflectance.

The first portion 321 may be disposed in correspondence with the hole H of the reflection plate 260, in which the light source 240 is disposed, and at least a part of the second portion 322 may be disposed overlapping with an area around the hole H.

The ratio of the light shielding material disposed in the first portion 321 to the first portion 321 may be larger than the ratio of the light shielding material disposed in the second portion 322 to the second portion 322.

For example, as in the example of FIG. 8A, the light shielding material may be disposed across the entirety of the first portion 321. The light shielding material may be disposed in predetermined pattern, only in a partial area of the second portion 322. While the light shielding material is shown as disposed in rhombus patterns in the second portion 322 in the example of FIG. 8A, the light shielding material may be disposed in the second portion 322 in any other figure than rhombus, a mesh, or the like.

That is, the presence of a partial area free of the light shielding material in the second portion 322 may lead to the reflectance of the second portion 322 smaller than the reflectance of the first portion 321.

Further, while the light shielding material is shown as disposed in predetermined patterns in the example of FIG. 8A, parts free of the light shielding material may be formed in predetermined patterns, when needed.

For example, as in the example of FIG. 8B, the light shielding material is not disposed in a ring-shaped area in each of the first portion 321 and the second portion 322 of the light shielding pattern 320. The width of each ring may be uniform.

Because there are areas free of the light shielding material in the first portion 321 and the second portion 322 and the ratios of the areas free of the light shielding material are different in the first portion 321 and the second portion 322, the reflectances of the first portion 321 and the second portion 322 may be different.

As the areas in which the light shielding material is disposed are in predetermined patterns or the areas in which the light shielding material is not disposed are in predetermined patterns, the light shielding pattern 320 including the first portion 321 having a high first reflectance and the second portion 322 having a low second reflectance may be implemented easily.

Alternatively, the first portion 321 and the second portion 322 may have different reflectances by disposing the light shielding material in the same shape and size, with different densities in the first portion 321 and the second portion 322.

For example, as in the example of FIG. 8C, the light shielding pattern 320 may be implemented by disposing the light shielding material in multiple dots. In this case, the density of the dots of the light shielding material disposed in the first portion 321 of the light shielding pattern 320 may be higher than the density of the dots of the light shielding material disposed in the second portion 322 of the light shielding pattern 320.

Therefore, the light shielding pattern 320 may be implemented, in which the reflectance gradually decreases farther from a point corresponding to the hole H with the light source 240 disposed therein.

As such, the light shielding pattern 320 has different reflectances in different areas, so that light may be diffused from the area corresponding to the hole H with the light source 240 disposed therein and the area around the hole H.

Further, light is supplied uniformly to the area between the light sources 240. The resulting increase in the gap between the light sources 240 may lead to reduction of the number of light sources 240 included in the backlight unit, while maintaining image quality.

Although the afore-described optical sheets may be disposed directly on these light shielding patterns 320, a configuration for protecting the light shielding patterns 320 and preventing an air gap between an optical sheet disposed on the light shielding patterns 320 and the light guide film 300 may be added.

Figure 9:
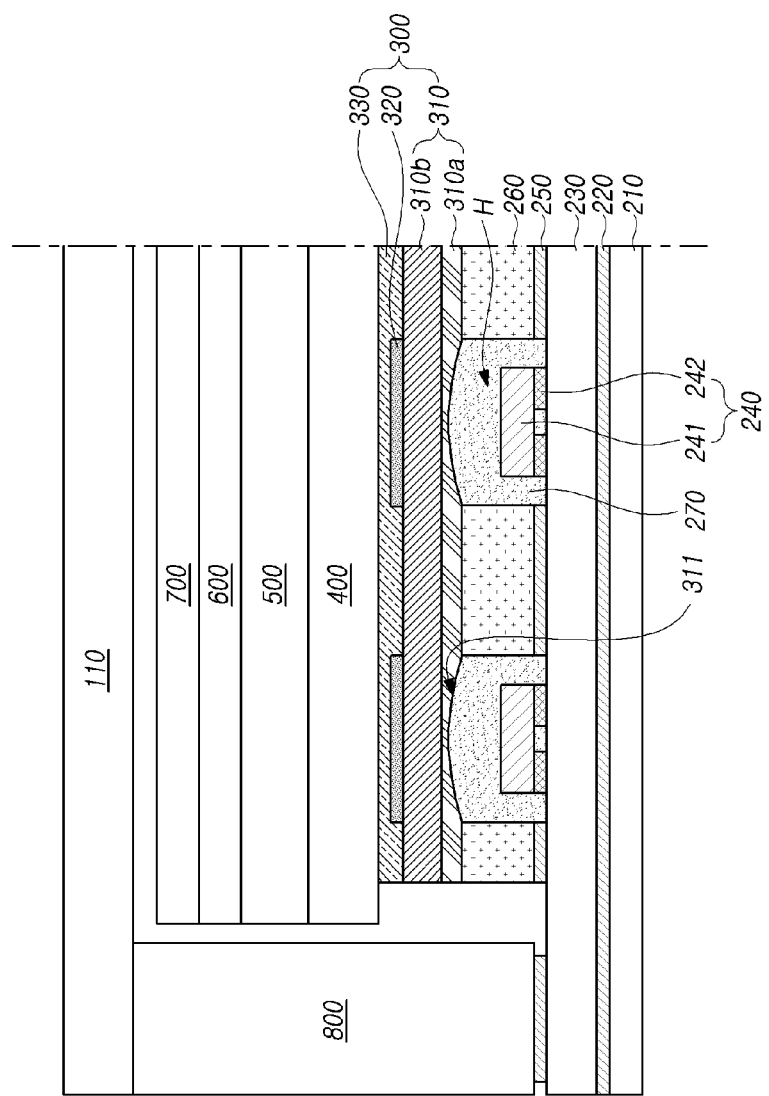
FIG. 9 is a diagram illustrating another exemplary cross-section structure of the backlight unit according to aspects of the present disclosure.

FIG. 9 is a diagram illustrating another exemplary cross-section structure of the backlight unit according to aspects of the present disclosure.

Referring to FIG. 9, light sources 240 may be disposed on the printed circuit 230, and the reflection plate 260 including a plurality of holes H may be disposed. The light sources 240 may be disposed in the holes H of the reflection plate 260, and light guide portions 270 may be disposed in the holes H, surrounding the light sources 240. That is, a light guide portion 270 may be disposed in each hole H.

The top surfaces of the light guide portions 270 may be shaped to be convex to improve the light extraction function and facilitate attachment to the light guide film 300. The light guide film 300 may be disposed on the light guide portions 270 and the reflection plate 260.

The light guide film 300 may include the first light guide layer 310a contacting the reflection plate 260 and the light guide portions 270, the second light guide layer 310b disposed on the first light guide layer 310a, and light shielding patterns 320 disposed on the second light guide layer 310b. Further, the light guide film 300 may further include a coating layer 330 disposed on the second light guide layer 310b and the light shielding patterns 320.

The first light guide layer 310a may include concave portions 311 on the bottom surface thereof, in correspondence with the convex top surfaces of the light guide portions 270, and provide the adhesion function and the light guiding function. The top surface of the first light guide layer 310a may be flat.

The second light guide layer 310b may be disposed on the first light guide layer 310a, thus providing the light guiding function, and may have a flat top surface.

The light shielding patterns 320 may be disposed on the second light guide layer 310b, in correspondence with the light sources 240 to provide the light shielding function, thereby preventing hot spots and improving image quality.

As in the afore-described example, each of the light shielding patterns 320 may have different reflectances in a portion corresponding to a hole H and a portion corresponding to an area around the hole H, so that light may be diffused uniformly around the light shielding pattern 320.

The coating layer 330 may be disposed on the light shielding patterns 320.

The coating layer 330 may be disposed on the top surface of the second light guide layer 310b and the light shielding patterns 320, and have a flat top surface. This coating layer 330 may be implemented as a part of the light guide film 300 or disposed separately from the light guide film 300, when needed.

As the coating layer 330 is disposed on the second light guide layer 310b and the light shielding patterns 320, the coating layer 330 may protect the light shielding patterns 320 and lead to planarization of the top surface of the light guide film 300.

Therefore, damage to the light shielding patterns 320 may be prevented, which might otherwise be caused by an optical member such as the diffusion plate 400 disposed on the light guide film 300. Particularly, when each of the light shielding patterns 320 has different reflectances in different areas, the light shielding material may be disposed in a different shape in each area. When the layout of the light shielding material is deformed by the diffusion plate 400 or the like, an intended reflectance may not be achieved accurately.

Because damage to the light shielding patterns 320 is prevented by disposing the coating layer 330 on the light shielding patterns 320 in the above manner, the light shielding patterns 320 each having various reflectances in different areas may be implemented.

Further, planarization of the top surface of the light guide film 300 through arrangement of the coating layer 330 on the light guide film 300 may result in the absence of an air gap between the light guide film 300 and the optical member disposed on the light guide film 300.

Therefore, full reflection of light emitted through the light guide layers 310 of the light guide film 300 from the air gap and the resulting decrease of light emission efficiency may be prevented.

Further, in aspects of the present disclosure, the light guide layers 310 included in the light guide film 300 may be formed in various structures to improve the light guiding performance and diffusion performance of the light guide film 300, while further reducing the thickness of the backlight unit.

Figure 10:
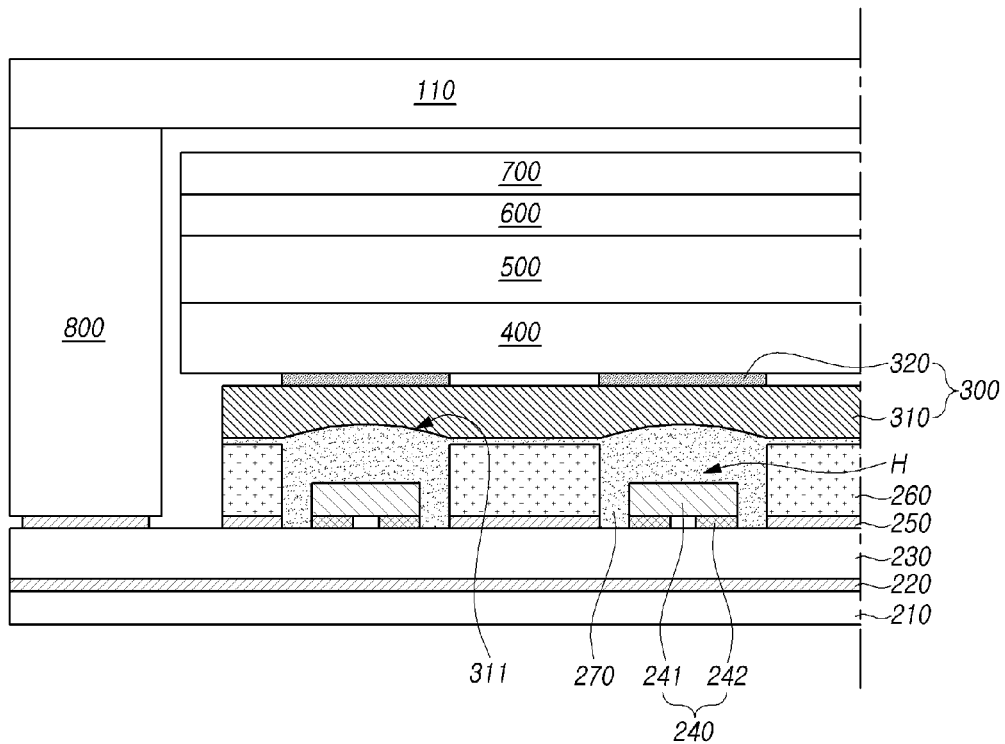
FIGS. 10, 11 and 12 are diagrams illustrating other exemplary cross-section structures of the backlight unit according to aspects of the present disclosure.
Figure 11:
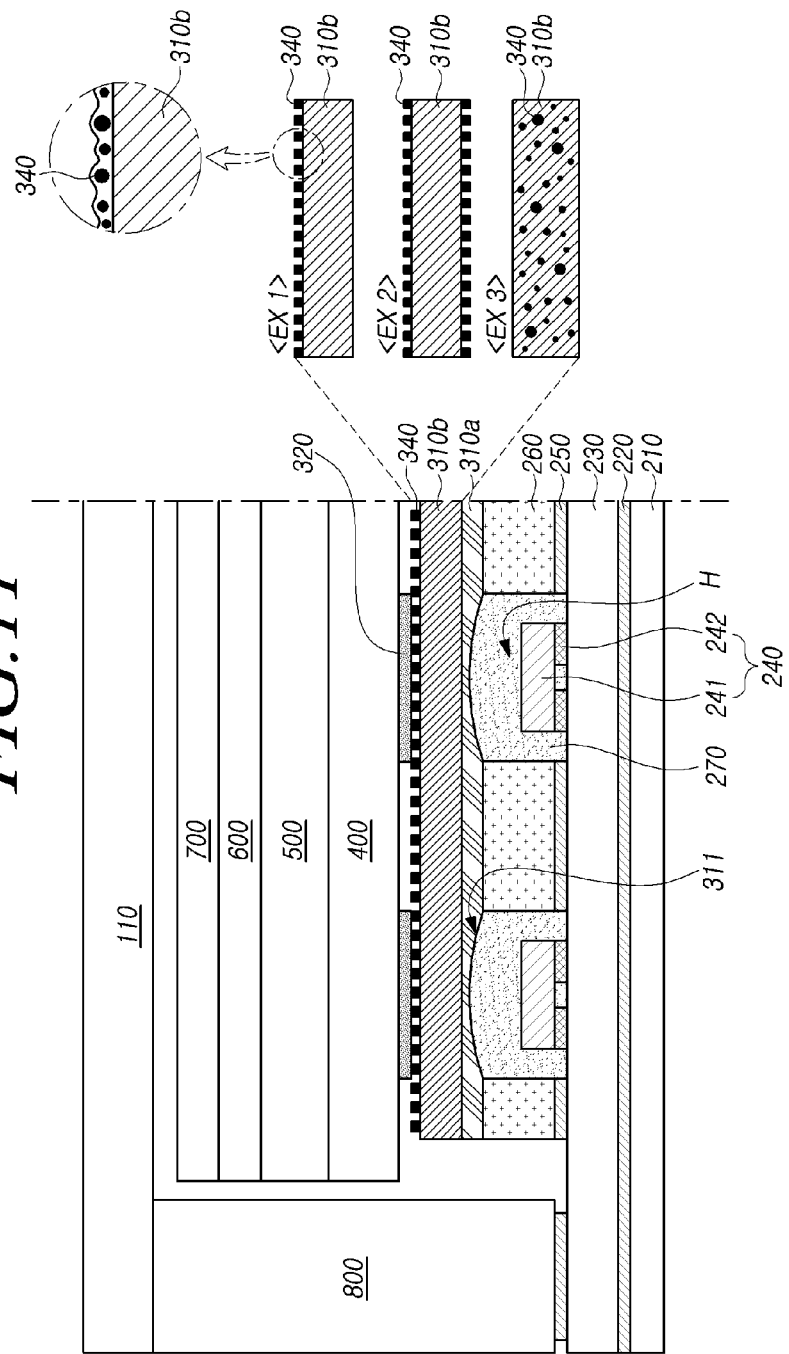
Figure 12:
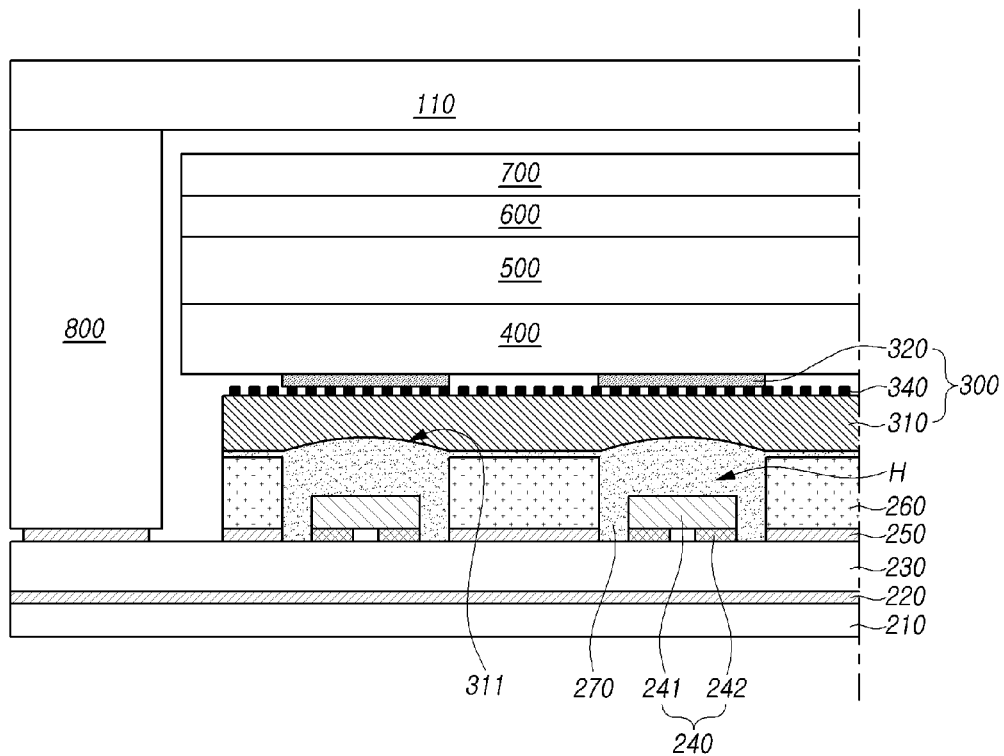

FIGS. 10, 11 and 12 are diagrams illustrating other exemplary cross-section structures of the backlight unit according to aspects of the present disclosure.

Referring to FIG. 10, the backlight unit may include light sources 240 disposed on the printed circuit 230, and the reflection plate 260 disposed on the printed circuit 230 and including holes H positioned in areas corresponding to the light sources 240. Light guide portions 270 may be disposed in the holes H of the reflection plate 260.

The light guide film 300 may be disposed on the light guide portions 270. Similarly to the foregoing example, the diffusion plate 400, the color conversion sheet 500, the prism sheet 600, and the diffusion sheet 700 may be disposed on the light guide film 300.

The light guide film 300 may include a light guide layer 310 contacting the light guide portions 270, and light shielding patterns 320 disposed on the light guide layer 310. That is, the light guide layer 310 of the light guide film 300 may be disposed in direct contact with the light guide portions 270.

As the light guide layer 310 is disposed in direct contact with the light guide portions 270, degradation of light diffusion performance may be prevented, which might otherwise be caused by arrangement of an adhesive layer between the light guide layer 310 and the light guide portions 270. Further, since the light diffusion performance is improved by the light guide film 300, the light guiding performance and diffusion performance may be maintained or improved, while the total thickness of the light guide film 300 may be reduced.

As the light guide layer 310 is disposed directly on the light guide portions 270, for example, the light guide portions 270 may provide an adhesion function. When the light guide portions 270 provide the adhesion function, a part of each of the light guide portions 270 may be disposed on the reflection plate 260.

That is, as illustrated in FIG. 10, the light guide portions 270 may be disposed inside the holes H of the reflection plate 260 and on the top surface of the reflection plate 260, and the light guide film 300 may be attached onto the light guide portions 270.

Alternatively, with the light guide portions 270 filled only in the holes H of the reflection plate 260, the light guide film 300 may be attached in some cases.

In this case, the light guide portions 270 may not be disposed on the top surface of the reflection plate 260. Alternatively, a part of each of the light guide portions 270 may be disposed only on a partial area of the top surface of the reflection plate 260. That is, there may be an area in which a light guide portion 270 is not disposed on the top surface of the reflection plate 260.

In the structure in which a part of each of the light guide portions 270 is disposed on the reflection plate 260, the top surfaces of the light guide portions 270 disposed in the holes H of the reflection plate 260 may be convex, or when needed, flat. When the top surfaces of the light guide portions 270 are convex, the bottom surface of the light guide layer 310 may include concave portions 311 positioned in areas corresponding to the light guide portions 270.

As such, the light guide layer 310 of the light guide film 300 may be disposed directly on the light guide portions 270 due to the adhesion function provided by the light guide portions 270, thereby preventing degradation of light diffusion performance, which might otherwise be caused by a low-transmittance adhesive layer. Further, the light guide film 300 may improve light guiding performance and diffusion performance, and increase the luminance and light efficiency of the backlight unit.

Alternatively, when an adhesive layer is disposed between the light guide film 300 and the light guide portions 270, the light guide film 300 may include a layer having the light diffusion function to improve the light diffusion performance.

Referring to FIG. 11, light sources 240 may be disposed on the printed circuit 230, and the reflection plate 260 including a plurality of holes H may be disposed. Light guide portions 270 may be disposed inside the hole H of the reflection plate 260.

The light guide film 300 may be disposed on the light guide portions 270 and the reflection plate 260.

The light guide film 300 may include the first light guide layer 310a providing the adhesion function and the light guiding function, the second light guide layer 310b disposed on the first light guide layer 310a, and light shielding patterns 320 disposed on the second light guide layer 310b.

The first light guide layer 310a may be disposed in contact with the top surfaces of the light guide portions 270 and the top surface of the reflection plate 260. The bottom surface of the first light guide layer 310a may include concave portions 311 corresponding to the convex shapes of the light guide portions 270.

The second light guide layer 310b may be disposed on the first light guide layer 310a, and provide the light guiding function.

A plurality of light diffusion particles 340 may be disposed on at least one surface of the second light guide layer 310b or inside the second light guide layer 310b.

For example, as illustrated a first example EX 1, a plurality of light diffusion particle 340 may be disposed on the top surface of the second light guide layer 310b. Alternatively, a plurality of light diffusion particle 340 may be disposed only on the bottom surface of the second light guide layer 310b in some cases. These light diffusion particles 340 may be coated on one surface of the second light guide layer 310b.

When the light diffusion particles 340 are disposed on the top surface of the second light guide layer 310b, the light diffusion particles 340 may be arranged across the entire top surface of the second light guide layer 310b and overlap with areas in which the light shielding patterns 320 are disposed. Alternatively, the light diffusion particles 340 may be disposed only in areas free of the light shielding patterns 320 on the top surface of the second light guide layer 310b.

In another example, as illustrated in a second example EX 2, a plurality of light diffusion particles 340 may be disposed on both of the top and bottom surfaces of the second light guide layer 310. The light diffusion particles 340 may be arranged across the entire bottom surface of the second light guide layer 310b. Further, the light diffusion particles 340 may be arranged across the entire top surface of the second light guide layer 310b or only in areas free of the light shielding patterns 320.

In another example, as illustrated in a third example EX 3, a plurality of light diffusion particles 340 may be arranged inside the second light guide layer 310b.

That is, the light diffusion particles 340 providing the light diffusion function may be disposed on the outer surface or inside of the second light guide layer 310b.

For example, the above-described light diffusion particles 340 may be, but not limited to, beads.

The arrangement of the light diffusion particles 340 in the second light guide layer 310b included in the light guide film 300 may lead to improved light diffusion performance.

Therefore, even when the light guide film 300 includes the first light guide layer 310a providing the adhesion function, the light guide film 300 may improve the light diffusion performance and increase the luminance and light efficiency of the backlight unit.

Further, as the light guide layers 310 providing the light diffusion function are directly attached on the light guide portions 270, the light diffusion performance of the light guide film 300 may further be increased.

Referring to FIG. 12, the reflection plate 260 including holes H may be disposed on the printed circuit 230 with light sources 240 disposed thereon. Light guide portions 270 may be disposed inside holes H of the reflection plate 260. The light guide film 300 may be disposed on the light guide portions 270.

The light guide film 300 may include a light guide layer 310 disposed on the light guide portions 270, and light shielding patterns 320 disposed on the top surface of the light guide layer 310.

Further, the light guide film 300 may include a plurality of light diffusion particles 340 disposed on at least one of the top and bottom surfaces of the light guide layer 310. Alternatively, the light diffusion particles 340 may be positioned inside the light guide layer 310.

As the light diffusion performance of the light guide layer 310 is improved due to arrangement of the light diffusion particles 340 on the outer surface or inside of the light guide layer 310, the luminance and light efficiency of the backlight unit may be increased.

Further, the absence of a low-transmittance adhesive layer between the light guide layer 310 and the light guide portions 270 may prevent degradation of light diffusion performance, which might otherwise be caused by the adhesive layer, and further increase the luminance and light efficiency of the backlight unit.

As the light guide layer 310 directly contacts the top surfaces of the light guide portions 270, the light guide portions 270 may provide the adhesion function.

Further, a part of each of the light guide portions 270 may be positioned on the top surface of the reflection plate 260. The light guide layer 310 may be attached by the light guide portions 270 positioned on the top surface of the reflection plate 260.

In the structure in which a part of each of the light guide portions 270 is disposed on the top surface of the reflection plate 260, the top surfaces of the light guide portions 270 disposed in the holes H of the reflection plate 260 may be convex. Alternatively, the top surfaces of the light guide portions 270 disposed in the holes H of the reflection plate 260 may be flat in some cases.

When the top surfaces of the light guide portions 270 disposed in the holes H of the reflection plate 260 are convex, the bottom surface of the light guide layer 310 disposed on the light guide portions 270 may include concave portions 311.

As such, an adhesive film may be eliminated from between the light guide film 300 and the light guide portions 270, and the light diffusion function may be given to the light guide layer 310 of the light guide film 300, thereby increasing light diffusion efficiency by the light guide film 300. Accordingly, the luminance and light efficiency of the backlight unit may be increased.

FIG. 13 is a table listing the test results of performance for respective backlight unit structures according to aspects of the present disclosure.

Referring to FIG. 13, Case 1 illustrates measurements of luminance, image quality, and power consumption, when the light guide film 300 disposed on the light guide portions 270 include the first light guide layer 310a providing the adhesion function, the second light guide layer 310b providing the light guiding function, and the light shielding patterns 320 in the backlight unit.

Further, FIG. 13 illustrates measurements of luminance and power consumption in backlight units including light guide films of different structures, with respect to the measured luminance and power consumption of Case 1 being 100%.

Case 2 illustrates measurements of luminance and so on in a structure in which the light guide film 300 is disposed on the light guide portions 270, without an adhesive layer in between.

It may be noted that as the light guide layer 310 of the light guide film 300 is disposed on the light guide portions 270 without an adhesive layer in between, and the light shielding patterns 320 are disposed on the light guide layer 310, Case 2 has an improved luminance of 107% and a reduced power consumption of 92%, with respect to Case 1, while maintaining image quality (BLU FOS: Backlight Unit Front Of Sight).

Case 3 illustrates measurements of luminance and so on, when the light guide film 300 disposed on the light guide portions 270 includes the first light guide layer 310a providing the adhesion function, the second light guide layer 310b disposed on the first light guide layer 310a, the light shielding patterns 320 disposed on the second light guide layer 310b, and the light diffusion particles 340 arranged on at least one surface or inside of the second light guide layer 310b.

Although the first light guide layer 310a providing the adhesion function is disposed, the second light guide layer 310b provides the diffusion function by the light diffusion particles 340, thereby improving light diffusion performance by the light guide film 300. Therefore, as illustrated in FIG. 13, it may be noted that Case 3 has an improved luminance of 110% and a reduced power consumption of 90%, with respect to Case 1, while maintaining image quality.

Case 4 illustrates a case in which the light guide film 300 is disposed on the light guide portions 270 without an adhesive layer in between. Further, Case 4 illustrates measurements of luminance and so on, when the light guide film 300 includes the light guide layer 310, the light shielding patterns 320 disposed on the top surface of the light guide layer 310, and the light diffusion particles 340 disposed on at least one surface or inside of the light guide layer 310.

It may be noted that as an adhesive layer degrading light diffusion performance is removed and the light diffusion performance of the light guide layer 310 is improved, Case 4 has an improved luminance of 108% and a reduced power consumption of 91%, with respect to Case 1.

Further, the light guide layer 310 is lower in light diffusion performance in Case 4 than the light guide film 300 in Case 3. Therefore, Case 4 may provide a similar level of light efficiency, while reducing cost, compared to Case 3. Further, when the light guide layer 310 of Case 4 has the same light diffusion performance as the light guide film 300 of Case 3, Case 4 may have a highest light efficiency because of the adhesive layer-free structure.

According to the above-described aspects of the present disclosure, because a light guide portion 270 is disposed in each hole H, and the light guide film 300 is disposed on the reflection plate 260 and the light guide portions 270 in the structure with the light sources 240 disposed in the holes H of the reflection plate 260, the backlight unit with a small thickness, which satisfies image quality may be provided.

Further, the backlight unit may be implemented easily by directly disposing the light guide film 300 on the light guide portions 270 and the reflection plate 260.

Further, because each of the light shielding patterns 320 has different reflectances in different areas, more light may be supplied to the area between the light sources 240. The resulting increase of the gap between the light sources 240 and maintenance of image quality may lead to reduction of the number of the light sources 240.

Further, when needed, the light guide film 300 is attached directly to the light guide portions 270, which obviates the need for arrangement of an adhesive layer degrading light diffusion performance between the light guide film 300 and the light guide portions 270, or the light guide layer 310 of the light guide film 300 has the light diffusion function. The resulting improvement of the light diffusion performance by the light guide film 300 may lead to a further increase in the light efficiency of the backlight unit, while the image quality of the backlight unit is maintained.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
a display panel; and
a backlight unit supplying light to the display panel,
wherein the backlight unit comprises:
a plurality of light sources disposed on a printed circuit;
a reflection plate disposed on the printed circuit and including a plurality of holes in which the plurality of light sources are disposed respectively, wherein the plurality of holes penetrate the reflection plate, and a top surface of the reflection plate is located higher than a top surface of each of the plurality of light sources;
a plurality of light guide portions disposed respectively in the plurality of holes and surrounding the plurality of light sources; and
a light guide film disposed on the reflection plate and the plurality of light guide portions,
wherein the light guide film includes at least one light guide layer having one surface on which a plurality of concave portions are included and a plurality of light shielding patterns positioned on a top surface of the light guide layer corresponding to the plurality of light sources, and the light guide film is supported by the top surface of the reflection plate to be apart from the top surface of each of the plurality of light sources, wherein each of the plurality of light shielding patterns includes a first portion having a first reflectance and a second portion disposed outside the first portion and having a second reflectance smaller than the first reflectance, and wherein the first portion is disposed at a position corresponding to the concave portion, and at least a part of the second portion is disposed at a position corresponding to a position around the concave portion.

2. The display device according to claim 1, wherein the plurality of light guide portions has a convex top surface, and at least a part of the top surface of the light guide portion is positioned higher than the top surface of the reflection plate.

3. The display device according to claim 1, wherein the plurality of light guide portions have top surfaces positioned on the same plane as the top surface of the reflection plate.

4. The display device according to claim 1, wherein the plurality of light guide portions have top surfaces directly in contact with a bottom surface of the light guide film.

5. The display device according to claim 4, wherein the plurality of light guide portions have a part positioned on the top surface of the reflection plate.

6. The display device according to claim 1, wherein the light guide film further includes a plurality of light diffusion particles disposed on at least one surface of the light guide layer or inside the light guide layer.

7. The display device according to claim 1, wherein the at least one light guide layer includes:
a first light guide layer contacting the top surface of the reflection plate and top surfaces of the plurality of light guide portions, and having a flat top surface; and
a second light guide layer disposed on the first light guide layer, and having a top surface on which the plurality of light shielding patterns are disposed.

8. The display device according to claim 7, wherein a thickest part of the first light guide layer has a thickness greater than a vertical distance between a highest point of each of the plurality of light guide portions and a highest point of the reflection plate.

9. The display device according to claim 7, wherein a thickness of the second light guide layer is greater than a thickness of the first light guide layer.

10. The display device according to claim 1, further comprising an adhesive layer disposed between the reflection plate, the plurality of light guide portions and the light guide film,
wherein the adhesive layer has a flat top surface and a bottom surface contacting the reflection plate and the plurality of light guide portions.

11. The display device according to claim 1, wherein a ratio of an area of a light shielding material disposed in the first portion to a total area of the first portion is larger than a ratio of an area of the light shielding material disposed in the second portion to a total area of the second portion.

12. The display device according to claim 1, wherein the first portion is positioned to correspond to the hole and at least a part of the second portion overlaps with a part of the reflection plate other than the hole.

13. The display device according to claim 1, wherein the light guide film further includes a coating layer disposed on the top surface of the light guide layer on which the plurality of light shielding patterns are disposed, and the coating layer having a flat top surface and protecting the plurality of light shielding patterns.

14. A backlight unit comprising:
a plurality of light sources disposed on a printed circuit;
a reflection plate disposed on the printed circuit and including a plurality of holes in which the plurality of light sources are disposed respectively, wherein the plurality of holes penetrate the reflection plate, and a top surface of the reflection plate is located higher than a top surface of each of the plurality of light sources;
a plurality of light guide portions respectively disposed in the plurality of holes and surrounding the plurality of light sources; and
a light guide film disposed on the reflection plate and the plurality of light guide portions, and including at least one light guide layer having one surface on which a plurality of concave portions are included and a plurality of light shielding patterns disposed on a top surface of the light guide layer corresponding to the plurality of light sources,
wherein the light guide film is supported by the top surface of the reflection plate to be apart from the top surface of each of the plurality of light sources,
wherein each of the plurality of light shielding patterns includes a first portion having a first reflectance and a second portion disposed outside the first portion and having a second reflectance smaller than the first reflectance, and
wherein the first portion is disposed at a position corresponding to the concave portion, and at least a part of the second portion is disposed at a position corresponding to a position around the concave portion.

15. A light guide film comprising:
a first light guide layer having one surface on which a plurality of concave portions are included and the other surface being flat and opposite to the one surface;
a second light guide layer contacting the other surface of the first light guide layer, and having both flat surfaces; and
a plurality of light shielding patterns disposed on a first surface of the second light guide layer other than a second surface of the second light guide layer, contacting the other surface of the first light guide layer,
wherein a thickness of the second light guide layer is greater than a thickness of the first light guide layer,
wherein each of the plurality of light shielding patterns includes a first portion having a first reflectance and a second portion disposed outside the first portion and having a second reflectance smaller than the first reflectance, and
wherein the first portion is disposed at a position corresponding to the concave portion, and at least a part of the second portion is disposed at a position corresponding to a position around the concave portion.

16. The light guide film according to claim 15, wherein the plurality of light shielding patterns are respectively disposed at positions corresponding to the plurality of concave portions.

17. The light guide film according to claim 16, wherein an area of at least one of the plurality of light shielding patterns is equal to or greater than an area of an entrance of a concave portion corresponding to the light shielding pattern.

18. The light guide film according to claim 15, further comprising a coating layer disposed on the surface of the second light guide layer on which the plurality of light shielding patterns are disposed, of both surfaces of the second light guide layer, protecting the plurality of light shielding patterns, and being flat on a surface opposite to a surface contacting the second light guide layer and the plurality of light shielding patterns.

19. The light guide film according to claim 15, further comprising a plurality of light diffusion particles disposed on at least one of both surfaces of the second light guide layer or inside the second light guide layer.

\* \* \* \* \*